United States Patent
Cheng

(10) Patent No.: US 7,695,537 B2
(45) Date of Patent: Apr. 13, 2010

(54) DUST COLLECTOR WITH A FUNCTION OF SECONDARY COLLECTION

(75) Inventor: Chieh-Yuan Cheng, No. 169, Chung Shan Road, Feng Yuan, Taichung (TW)

(73) Assignees: Chieh-Yuan Cheng, Taichung (TW); San Ford Machinery Co., Ltd., Taichung (TW)

( * ) Notice: Subject to any disclaimer, the term of this patent is extended or adjusted under 35 U.S.C. 154(b) by 394 days.

(21) Appl. No.: 11/781,415

(22) Filed: Jul. 23, 2007

(65) Prior Publication Data

US 2009/0025348 A1    Jan. 29, 2009

(51) Int. Cl.
B01D 51/00    (2006.01)

(52) U.S. Cl. .............. 55/467; 55/473; 55/361; 55/372; 55/374; 55/320

(58) Field of Classification Search ........... 55/467, 55/473, 361, 372, 374, 378, 413, 416, 418, 55/320, 304, 305
See application file for complete search history.

(56) References Cited

U.S. PATENT DOCUMENTS

| | | | | |
|---|---|---|---|---|
| 2,216,249 A * | 10/1940 | Nelson | ........................... | 285/7 |
| 2,413,499 A * | 12/1946 | Hulton | ........................ | 55/303 |
| 2,483,690 A * | 10/1949 | Carlson | ....................... | 55/300 |
| 2,824,335 A * | 2/1958 | Moffat | ........................ | 15/345 |
| 3,308,608 A * | 3/1967 | Brimberg | ..................... | 96/382 |
| 3,343,199 A * | 9/1967 | Nolte | .......................... | 15/319 |
| 3,910,781 A * | 10/1975 | Bryant, Jr. | .................. | 55/305 |
| 3,938,971 A * | 2/1976 | McClure | ...................... | 55/300 |
| 4,276,701 A * | 7/1981 | Takacs et al. | ................ | 34/109 |
| 4,465,498 A * | 8/1984 | Stephenson | ............... | 55/341.2 |
| 4,581,050 A * | 4/1986 | Krantz | ..................... | 55/315.2 |
| 4,715,872 A * | 12/1987 | Snyder | ....................... | 55/315 |
| 4,917,712 A * | 4/1990 | Crigler | ........................ | 95/280 |
| 4,993,107 A * | 2/1991 | Zoni | ............................ | 15/352 |
| 5,013,333 A * | 5/1991 | Beaufoy et al. | ................ | 95/20 |
| 5,066,315 A * | 11/1991 | Haberl et al. | ................. | 95/271 |
| 5,163,985 A * | 11/1992 | Chen | ........................... | 55/356 |
| 5,169,420 A * | 12/1992 | Chen | ........................... | 55/315 |
| 5,259,854 A * | 11/1993 | Newman | ..................... | 55/320 |
| 5,857,420 A * | 1/1999 | Nishiyama | .................. | 110/346 |
| 6,221,135 B1 * | 4/2001 | Wirth et al. | ................... | 95/273 |
| 6,507,974 B1 * | 1/2003 | Cheng | ......................... | 15/347 |
| 6,797,046 B2 * | 9/2004 | Wang | .......................... | 96/421 |
| D501,964 S * | 2/2005 | Cheng | ........................ | D32/21 |

(Continued)

FOREIGN PATENT DOCUMENTS

JP    03288511 A * 12/1991

(Continued)

Primary Examiner—Jason M. Greene
Assistant Examiner—Dung Bui
(74) Attorney, Agent, or Firm—Ming Chow; Sinorica, LLC

(57) ABSTRACT

A dust collector with a function of secondary collection is composed of a bottom base, an air guiding box installed above the bottom base and bored with a suction hole and a dust collecting hole at its upper and bottom surface respectively, a guiding device set inside the air guiding box, a filtering bag fixed on the guiding device, and a dust bag sealed with the lower dust collecting hole of the air guiding box. In using, dust can be drawn in by a blower to enter the air-guiding box. With a secondary filtration to prolong a service life of the filtering bag.

4 Claims, 5 Drawing Sheets

U.S. PATENT DOCUMENTS

| | | | | |
|---|---|---|---|---|
| D502,297 S | * | 2/2005 | Cheng | D32/21 |
| 6,875,248 B1 | * | 4/2005 | Shelton et al. | 55/356 |
| 6,946,011 B2 | * | 9/2005 | Snyder | 55/418 |
| 7,044,991 B2 | * | 5/2006 | Wang | 55/366 |
| 7,186,281 B2 | * | 3/2007 | Cheng | 55/289 |
| 7,217,307 B2 | * | 5/2007 | Cheng | 55/356 |
| 2005/0076624 A1 | * | 4/2005 | Cho | 55/356 |
| 2009/0199359 A1 | * | 8/2009 | Hyun et al. | 15/347 |

FOREIGN PATENT DOCUMENTS

| | | | |
|---|---|---|---|
| JP | 2006255041 A | * | 9/2006 |
| JP | 2007151599 A | * | 6/2007 |

* cited by examiner

DUST COLLECTOR WITH A FUNCTION OF SECONDARY COLLECTION

BACKGROUND OF THE INVENTION

1. Field of the Invention

This invention relates to a dust collector, particularly to one with a function of secondary collection.

2. Description of the Prior Art

As shown in FIG. 1, a conventional dust collector is commonly used to collect dust or waste powder generated during operation in factories. The conventional dust collector is mainly composed of a bottom base 1, a supporting frame 2 installed above and at two sides of the bottom base 1, an air guiding box 3 fixed above the supporting frame 2, a motor 4 set above the right side of the air guiding box 3, a suction tube 5 set below the right side of the air guiding box 3 to correspond to the motor 4, a filtering bag 6 set above the left side of the air guiding box 3, and a dust bag 7 set below the left side of the air guiding box 3 to correspond to the filtering bag 6. Installed inside the air-guiding box 3 are blades (not shown in the FIG.) driven by the motor 4. In using, the blades are driven by the motor 4 to rotate to start sucking in the suction tube 5 to keep dust or powder sucked in from the end of the suction tube 5 to the other side of the air guiding box 3, and then let air pass through a filtering bag positioned above and keep dust and waste powder dropping down to the dust bag 7.

However, as the filtering bag 6 and the dust bag 7 are not separated by any isolating devices installed between them, dust or waste powder supposed to drop in the dust bag 7 may flow to and attach on the filtering bag 6 to clog air holes thereon. So, the filtration bag 6 must be often replaced to maintain smooth filtration, causing an increase of cost and an inconvenient use.

SUMMARY OF THE INVENTION

The objective of this invention is to offer a dust collector with a function of secondary collection.

The main characteristics of the invention are a bottom base, an air-guiding box, a blower, a guiding device, a filtering bag and a dust bag. The air-guiding box is installed above the bottom base, having an empty interior and bored with a suction hole and a dust-collecting hole at its upper and bottom surface respectively. The blower is fitted in one of the suction holes. The guiding device is installed inside the air-guiding box, having its upper side fixed with the upper dust-collecting hole of the air-guiding box and sealed with the filtering bag. The dust bag is fixed with the lower dust-collecting hole of the air-guiding box. Therefore, dust can be drawn in the other suction hole by the blower to enter the air-guiding box. By means of the guiding device installed between the filtering bag and the dust bag, it can primarily prevent the dust from directly entering the upper dust collecting hole of the air guiding box, but enforcing larger particles to drop down to the dust bag directly and drawing lighter ones to flow through the guiding device to the filtering bag for being filtered. So, a secondary filtration is done to prolong a service life of the filtering bag, with a reduction of cost.

BRIEF DESCRIPTION OF DRAWINGS

This invention is better understood by referring to the accompanying drawings, wherein.

DETAILED DESCRIPTION OF THE PREFERRED EMBODIMENT

Figure 1:
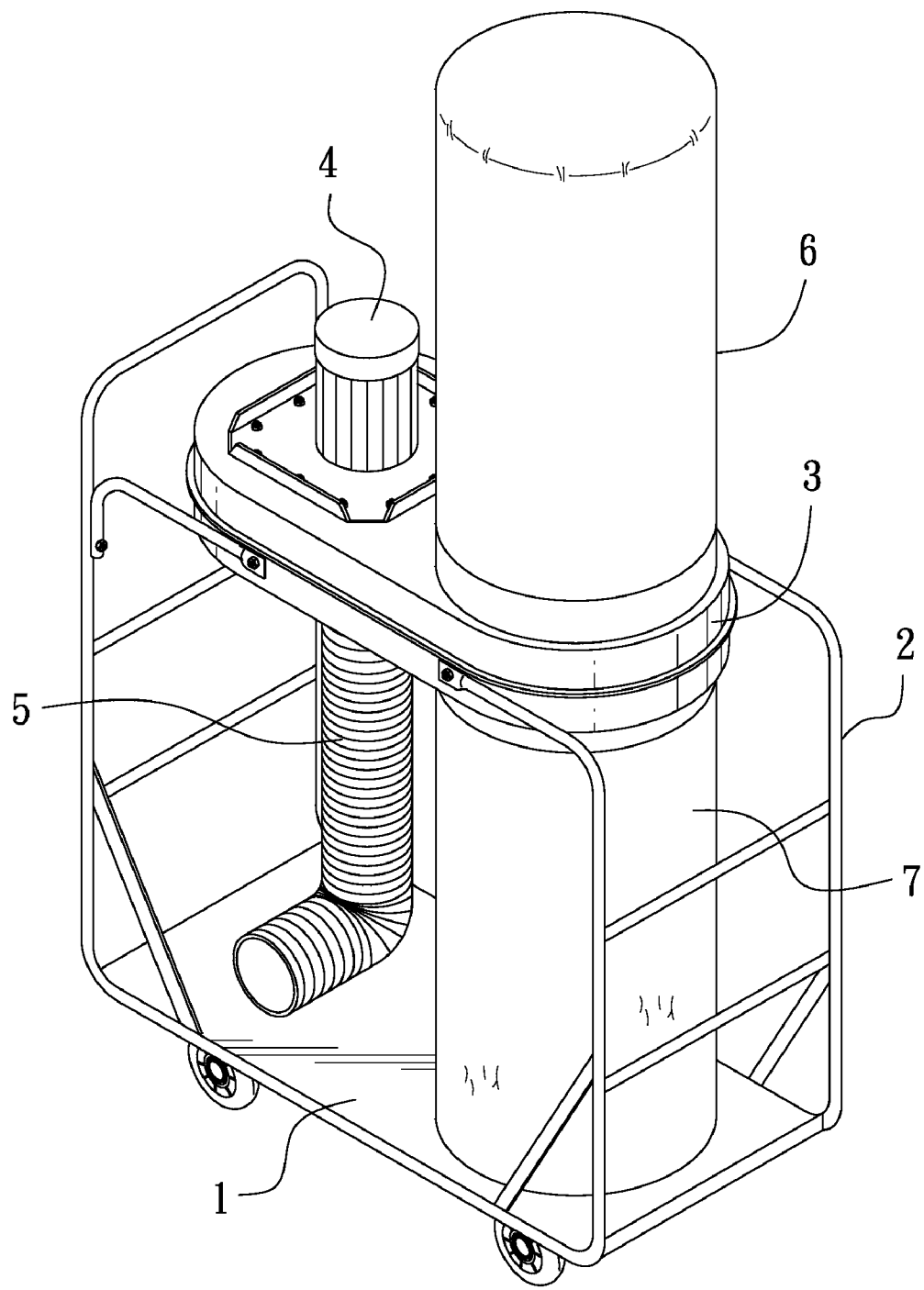
FIG. 1 is a perspective view of a conventional dust collector.
Figure 2:
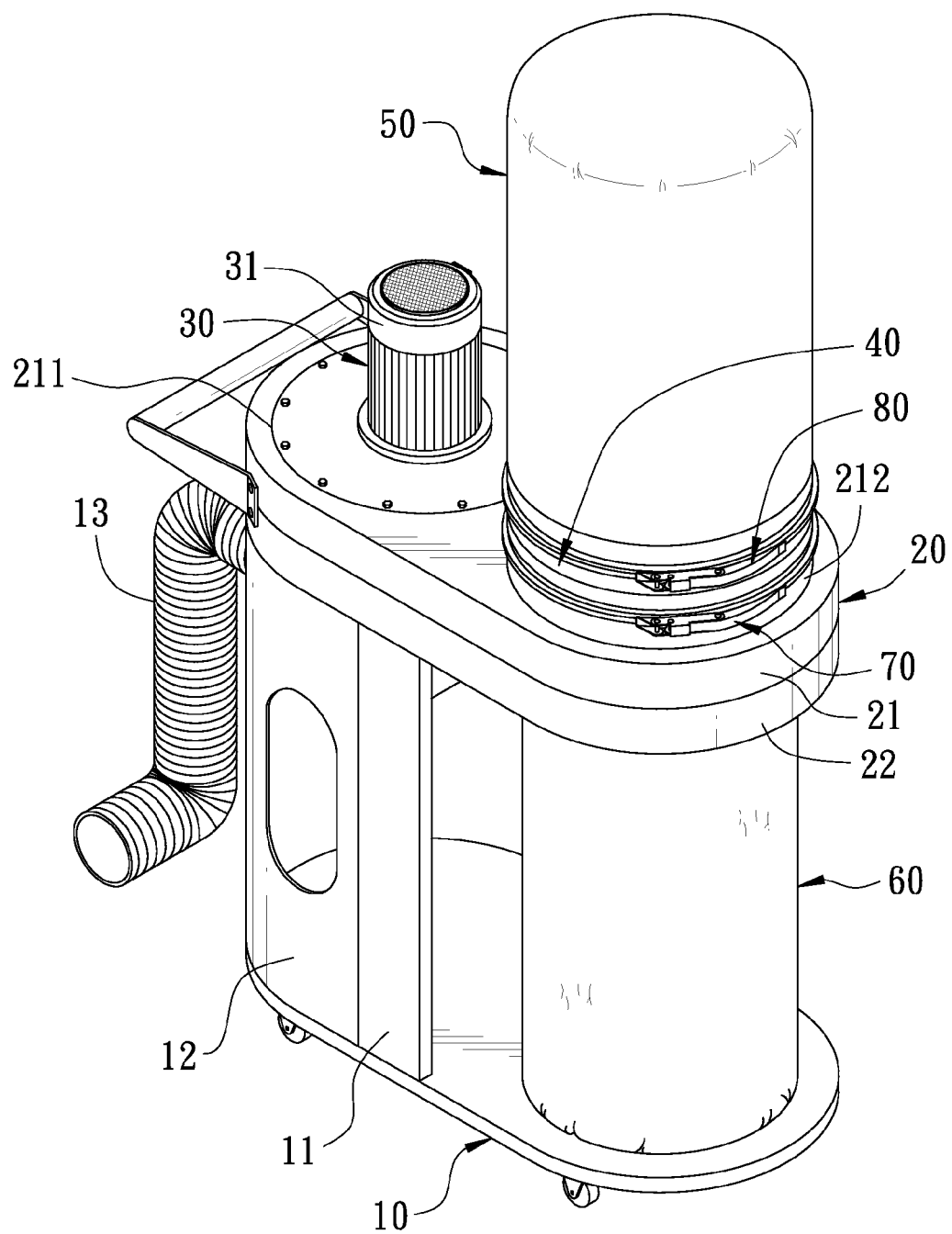
FIG. 2 is a perspective view of a first preferred embodiment of a dust collector with a function of secondary collection in the present invention.
Figure 3:
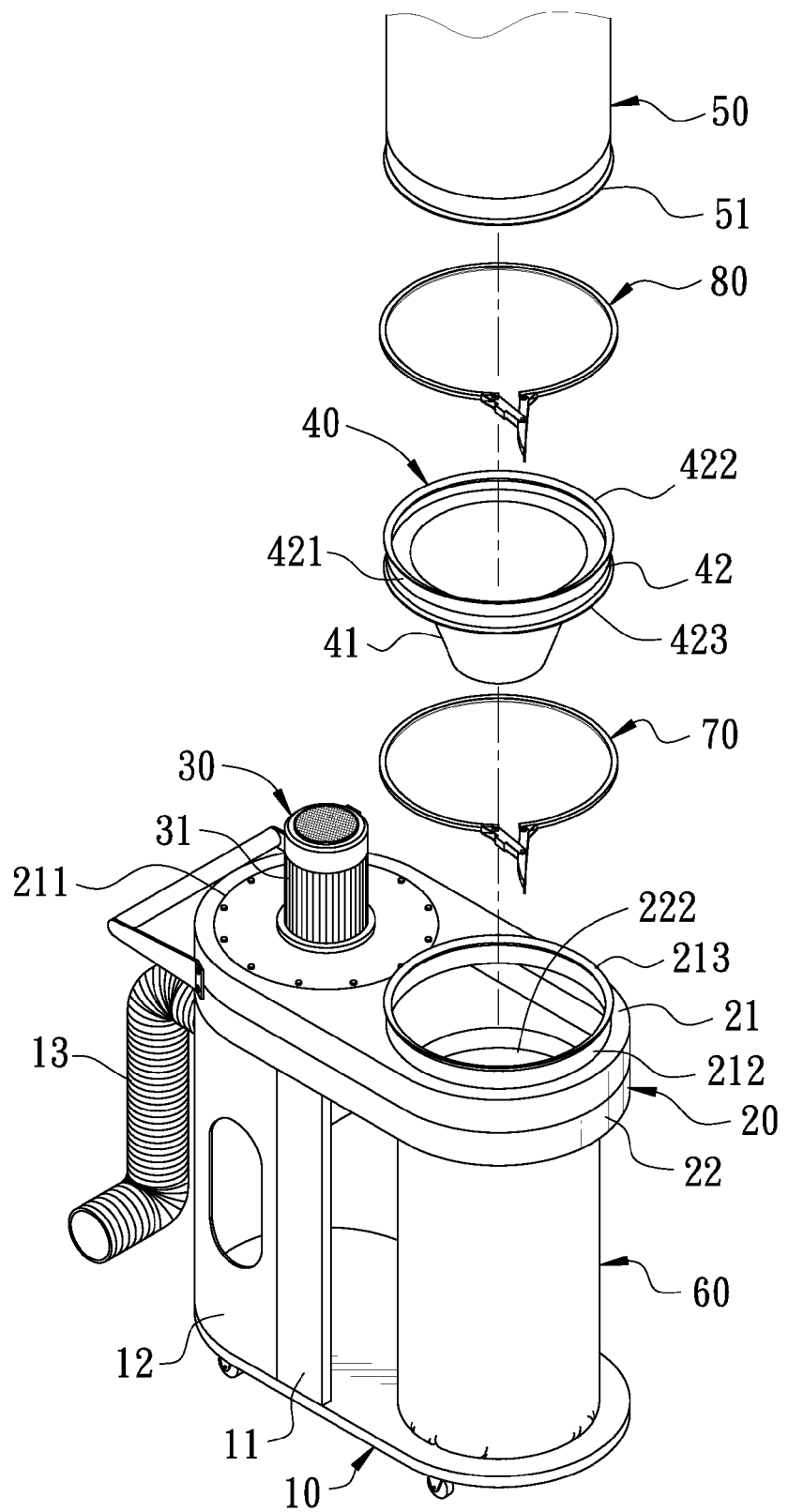
FIG. 3 is an exploded perspective view of the first preferred embodiment of a dust collector with a function of secondary collection in the present invention.
Figure 4:
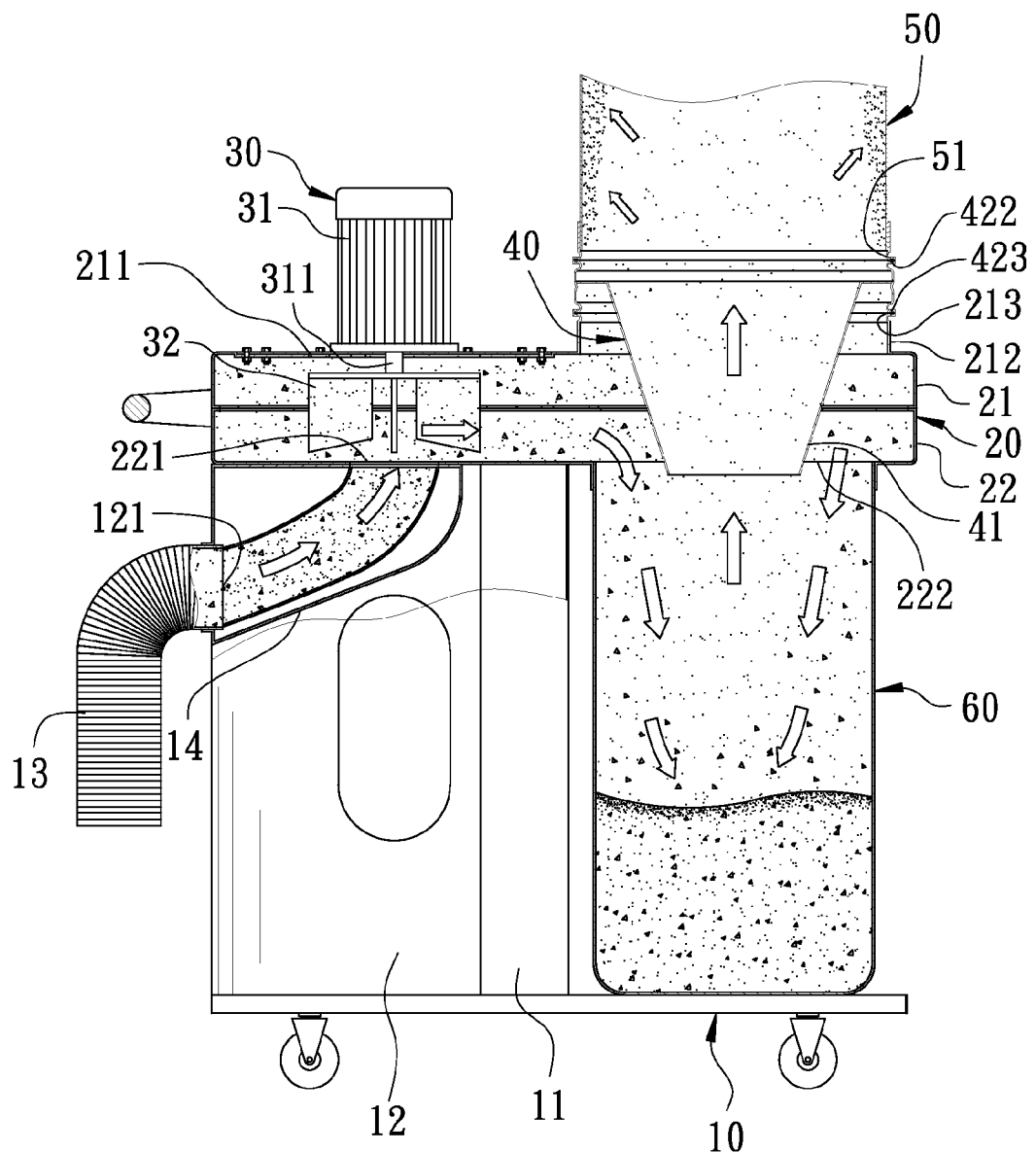
FIG. 4 is a side cross-sectional view of the first preferred embodiment of a dust collector with a function of secondary collection in the present invention, showing it being used.

As shown in FIGS. 2~4, a first preferred embodiment of a dust collector with a function of secondary collection in the present invention is composed of a bottom base 10, an air guiding box 20, a blower 30, a guiding device 40, a filtering bag 50 and a dust bag 60.

The bottom base 10 is provided with an isolating board 11 located at its intermediate portion to symbolically divide the bottom base 10 into a right and a left side, and an outer shell 12 formed around the left side. The outer shell 12 is provided with an opening 121 bored in its one side for connecting with a suction tube 13.

The air-guiding box 20 is installed above the isolating board 11 and the outer shell 12 of the bottom base 10, symbolically divided into a right and a left side, and provided with an upper shell 21 and a lower shell 22. The upper shell 21 is provided with a suction hole 211 bored at its left side, a dust collecting hole 212 bored at its right side, and an annular projection 213 extended upward around the dust collecting hole 212. The lower shell 22 is provided with a suction hole 221 and a dust-collecting hole 222 respectively corresponding to the suction hole 211 and the dust collecting hole 212 of the upper shell 21. And, a connecting tube 14 is installed to link the suction hole 221 and the opening 121.

The blower 30 is composed of a motor 31 and plural blades 32. The motor 31 is fixed on the top of the suction hole 211, provided with a shaft 311 extended into the air guiding box 20 with the blades 32 set around it.

The guiding device 40 is installed inside the air guiding box 20 with its upper side positioned around the dust collecting hole 212, provided with a hood 41 and a positioning portion 42 formed as an annular frame above the hood 41. The hood 41 is shaped as a funnel tapered gradually downward. The guiding device 40 has its upper and its lower end respectively fitted in the dust collecting holes 212 and 222, keeping the air guiding box 20 divided into two spaces. As the diameter of the dust collecting hole 222 is larger than that of the lower end of the guiding device 40, there is an annular gap remained between them. The positioning portion 42 is provided with an annular groove 421 formed around it, and two annular projections 422 and 423 respectively formed around the upper and the lower edge of the groove 421. The guiding device 40 is fixed together with the dust-collecting hole 212 by a fastening ring 70 constricted around the annular projections 423 and 213.

The filtering bag 50 is provided with an annular projection 51 extended around its opening for corresponding to the annular projection 422 of the guiding device 40. The annular projections 51 and 422 are constricted together by a fastening ring 80. And, the filtering bag 50 is made of a porous material and canvas used in this embodiment, and formed cylindrical.

The dust bag 60 is made of plastic, having its opening sealed around the dust collecting hole 222 of the air guiding box 20, and connected with the filtration bag 50 via the guiding device 40.

In assembling, the guiding device 40 is first put in the dust collecting hole 212, and next keep the annular projection 213 of the dust collecting hole 212 and the dust collecting hole 423 of the guiding device 40 constricted together by the fastening ring 70. Then, put the filtering bag 50 on the top of the guiding device 40 and keep the dust collecting hole 422 of the guiding device 40 and the annular projection 51 of the filtering bag 50 constricted together by the fastening ring 80. Finally, the dust bag 60 is fixed around the dust collecting hole 222 with its opening.

In using, when the power switch is turned on, the motor 31 is to drive the blades 32 to rotate to carry out suction inside the suction tube 13, so as to draw in dust or waste powder from the end opening of the suction tube 13 to the other side of the air-guiding box 20. By the time, being blocked outside the guiding device 40, the dust or the waste powder can just pass through the annular gap between the guiding device 40 and the dust-collecting hole 222 to the dust bag 60. Of course, some very light or tiny particles may be carried by air to flow up through the lower opening of the guiding device 40 into the filtering bag 50 for being filtrated. Therefore, a secondary collection is done.

Figure 5:
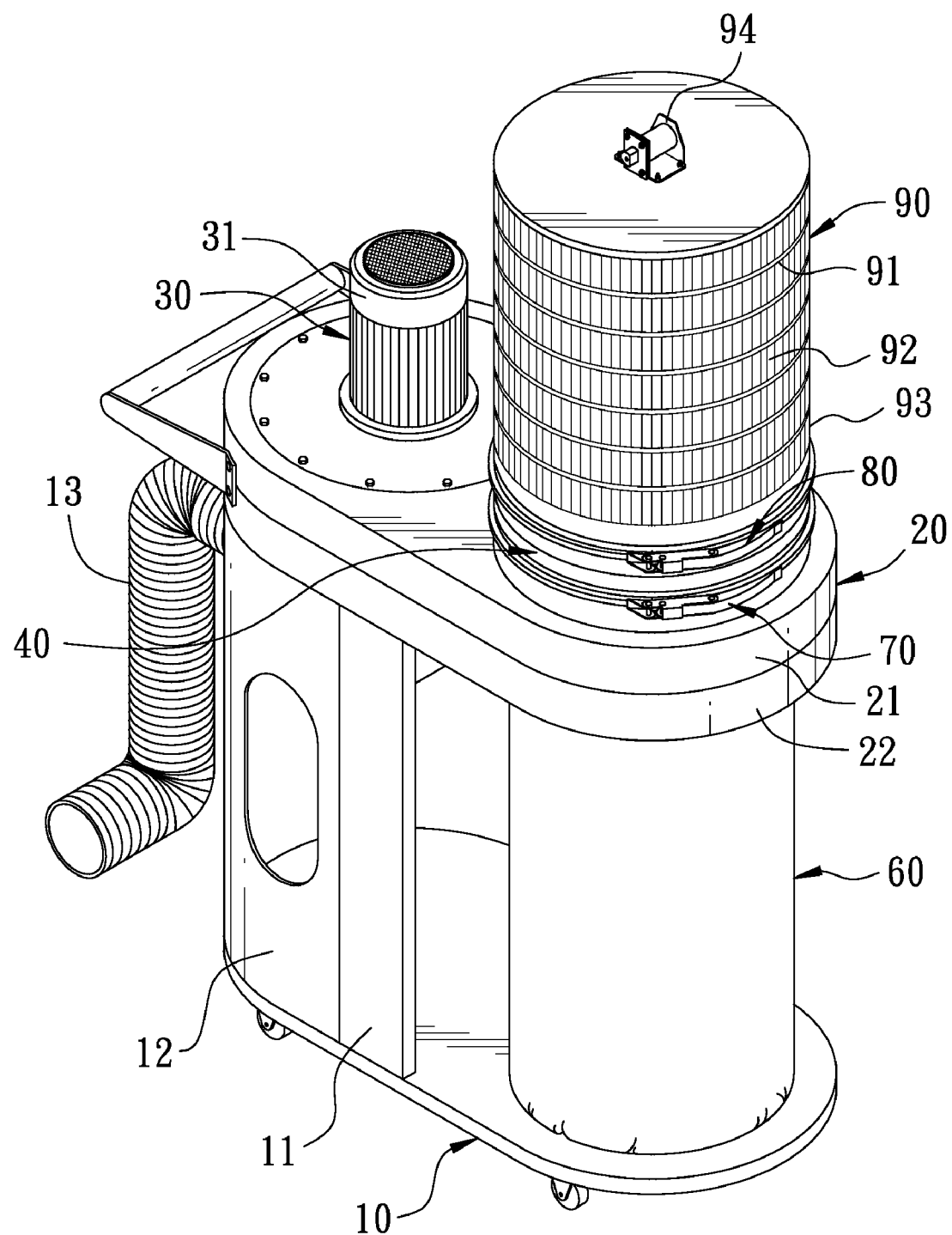
FIG. 5 is a perspective view of a second preferred embodiment of a dust collector with a function of secondary collection in the present invention.

As shown in FIG. 5, a second preferred embodiment of a dust collector with a function of secondary collection in the present invention has the same components as the first embodiment does, except that the filtering bag 50 is replaced with a filtering bag 90 provided with a jacket 91 and a filtration cylinder 93 made of porous filtration paper 92, and installed inside the jacket 91. Moreover, a vibration motor 94 is installed above the jacket 91 to keep the dust attaching on the filtration cylinder 93 shaken to drop into the dust bag 60, for lengthening the service life of the filtration bag 90.

The invention has the following advantages as can be seen from the foresaid description.

1. With the guiding device 40 installed inside the air guiding box 20 and between the filtering bag 50 and the dust bag 60 to prevent dust from directly sucked to the filtering bag 50 above the air guiding box 20, the larger particles are to drop down to the dust bag 60 and the lighter ones are to be led by the guiding device 40 to flow up to the filtering bag 50. So, a secondary collection is done to prolong the service life of the filtration bag, posing a reduction of cost.

2. The guiding device 40 has a simple structure that it is easily assembled or disassembled, and does not increase its bulk.

While the preferred embodiment of the invention has been described above, it will be recognized and understood that various modifications may be made therein and the appended claims are intended to cover all such modifications that may fall within the spirit and scope of the invention.

What is claimed is:

1. A dust collector with a function of secondary collection comprising:
    a bottom base; an air guiding box installed above said bottom base, having an empty interior and provided with a suction hole and a dust collecting hole bored corresponding at its top and its bottom surface respectively;
    a blower composed of a motor and plural blades, said motor fixed on a top of one of said suction holes and provided with a shaft extended into said air guiding box with said blades set around said shaft;
    a guiding device installed inside said air guiding box with its upper side positioned around said upper dust collecting hole and provided with a hood shaped as a funnel tapered gradually downward and a positioning portion located on said hood;
    a filtering bag having its opening fixedly sealed with a top of said positioning portion of said guiding device;
    a dust bag having its opening fixedly sealed with said lower dust collecting hole of said air guiding box;
    said positioning portion is formed as an annular frame and provided with an annular groove formed around its intermediate portion;
    two annular projections respectively formed around an upper and a lower edge of said groove;
    said upper dust collecting hole provided with an annular projection formed around its upper side for corresponding to said lower annular projection of said positioning portion; and
    said filtration bag provided with an annular projection formed at its opening in corresponding to said upper annular projection of said positioning portion.

2. The dust collector with a function of secondary collection as claimed in claim 1, wherein said guiding device is sealed on said upper dust collecting hole by a fastening ring wrapped around said lower annular projection of said positioning portion and that of said dust collecting hole, and said filtering bag is sealed with said guiding device by a fastening ring constricted around said upper annular projection of said guiding device and said annular projection of said filtering bag.

3. The dust collector with a function of secondary collection as claimed in claim 1, wherein one of said suction holes is connected with a suction tube.

4. The dust collector with a function of secondary collection as claimed in claim 1, wherein said filtering bag is provided with a jacket and a filtering cylinder that is made of porous filtration paper and installed inside said jacket, with a vibration motor installed above said jacket.

* * * * *